Patented July 8, 1941

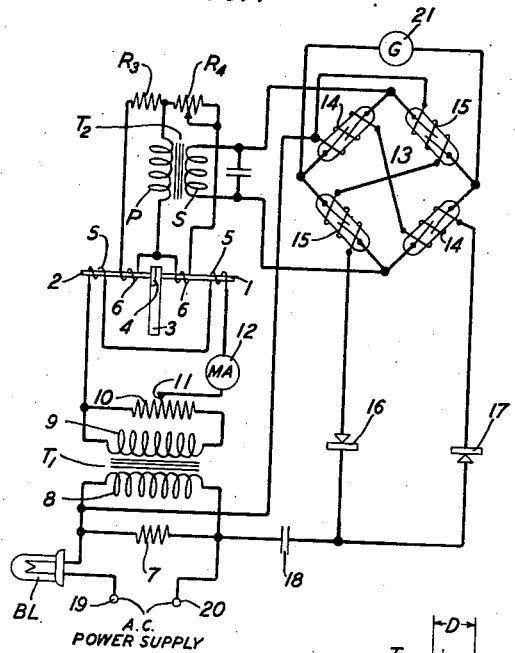
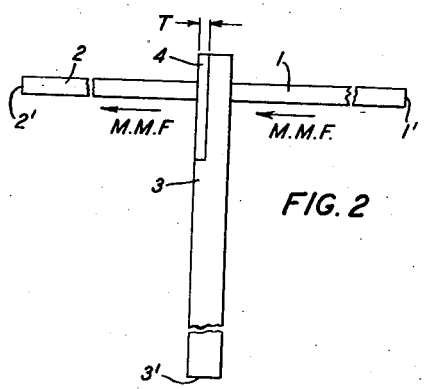
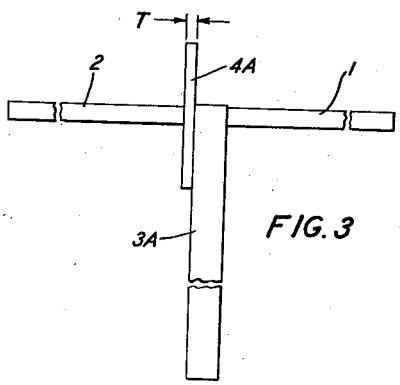
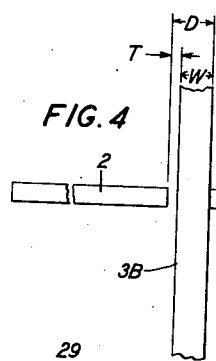
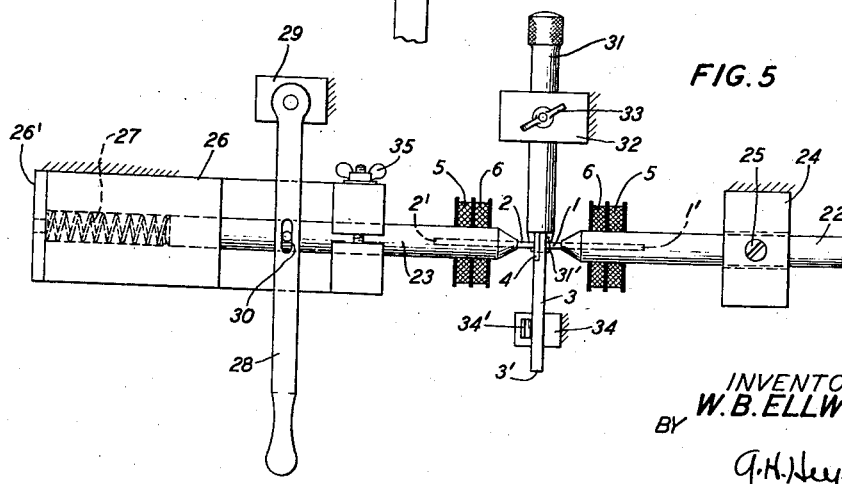

2,248,569

UNITED STATES PATENT OFFICE 2,248,569

MAGNETIC MICROMETER

Walter B. Ellwood, New York, N. Y., assignor to Bell Telephone Laboratories, Incorporated, New York, N. Y., a corporation of New York Application May 23, 1940, Serial No. 336,802

6 Claims. (Cl. 33—147)

This invention relates to apparatus for measuring small distances, and more particularly to a magnetic micrometer for measuring the thickness of relatively thin sheet materials.

One particular problem which this invention is peculiarly adapted to solve is the measurement of the thickness of a relatively thin inlay of non-magnetic material as for example a small inlay of contact metal permanently attached to a magnetic contact strip. Such measurements are made by this apparatus without in any way destroying or injuring the inlay. Heretofore such measurements have been made by the long tedious process of first sectioning the inlay and then measuring the distance to the margin between the inlay and the magnetic strip with a microscope micrometer. Measurements by the apparatus of this invention not only does not injure the test specimen but from numerous tests it has been found that they may be made rapidly and with great reliability.

It is the object of this invention to provide a means for rapidly and accurately measuring small distances substantially devoid of magnetic material.

The foregoing object is attained by this invention which provides a normally balanced magnetic bridge having two magnetic paths which is rendered unbalanced by the insertion of the distance to be measured in one of the paths and means for measuring the degree of unbalance.

The invention may be better understood by referring to the drawing in which:

Fig. 1 is a schematic of the essential magnetic elements and associated electrical circuits of the preferred embodiment;

Fig. 2 is an enlargement of the magnetic bridge elements of Fig. 1 where the thickness of an inlay is to be measured;

Fig. 3 is similar to Fig. 2 except that it discloses how the thickness of any non-magnetic material, such as paper or foil, is measured;

Fig. 4 discloses how the thickness of a sheet of magnetic material is indirectly measured by the apparatus of Fig. 1; and Fig. 5 shows the essential elements of a preferred form of jig for holding the magnetic bridge elements of Fig. 1.

Referring now to Fig. 1, the magnetic bridge comprises two similar collinear probes 1, 2 preferably of some good magnetic material, such as permalloy. These probes may be laminated if desired but for most practical embodiments they are of relatively small cross-sectional area and may be solid. One of these probes is preferably fixed and the other movable and an elastic means hereinafter more particularly described is used to urge them together and to include between their engaging faces a third strip or sheet of magnetic material 3.

Magnetic probes 1, 2 and strip or sheet 3, together with their inherent air leakage paths, constitute a magnetic bridge. A magnetomotive force is impressed on probes 1 and 2 by means of coils 5, 5 which have equal numbers of turns and are serially connected in the same magnetic sense to a suitable source of alternating current supply through transformer T₁ and potentiometer 10. The alternating current voltage supply is connected to the primary 8 of transformer T₁ via terminals 19, 20 and ballast lamp BL which serves to regulate and maintain constant the voltage output of secondary 9. The current through coils 5, 5 is adjusted by slider 11 of potentiometer 10 to a predetermined value as read by milliammeter 12. Terminating resistor 7 is of such magnitude as to bring the ballast lamp BL to the operating portion of its regulating characteristic.

The electrical circuits so far described impress alternating magnetomotive forces on probes 1, 2 and in the same direction along their common axis. Referring now to Fig. 2, the instantaneous values of these magnetomotive forces are as indicated by the arrows. Assuming for the moment that magnetic strip 3 does not contain the non-magnetic inlay 4 and that both probes 1, 2 are contiguous with its opposite surfaces, it is apparent that there are two well-defined magnetic paths, one through probe 1 into strip 3, out from the end 3' of strip 3, through an air path and back to probe 1 at its extremity 1'. The other path is similarly traced through probe 2, extremity 2', the air path, into the end 3' of strip 3, along strip 3 and back to probe 2. If it is assumed further that these two paths contain equal air path reluctances they will be in substantial balance so that the net flux in strip 3 is reduced to zero. Now, if another strip 3 having an inlay 4 of thickness T is inserted so that the exposed inlay surface is contiguous with probe 2, the reluctance of the path through probe 2 is increased by an amount $T/\mu a_p$ where $a_p$ is the cross-sectional area of probe 2 and $\mu$ is the relative permeability of the inlay, which is a constant approximately equal to unity. This unbalances the magnetic bridge and permits a resultant flux in strip 3 equal to the difference between the flux in probe 1 and the flux in probe 2. The magnitude of this difference in flux is, moreover, a function of the inserted reluctance and hence a function of the thickness of the non-magnetic inlay.

Unbalance is detected by means of two serially-connected coils 6, 6 also of equal numbers of turns wound in the same sense and mounted on probes 1 and 2 in a manner similar to coils 5, 5. These two coils and resistors R₃ and R₄ comprise the two branches of an electric bridge. It is evident that if the two coils 6, 6 are linked by equal fluxes the two generated electromotive forces will be equal and additive. Moreover, if R₄ is made equal to R₃ the voltage across the primary P of transformer T₂ will be zero because the bridge will be balanced. However, when the fluxes in probes 1 and 2 differ the generated electromotive forces in coils 6, 6 differ and an unbalance voltage will appear across primary P, which voltage is a definite function of the difference in fluxes in probes 1 and 2 and consequently a definite function of the inlay thickness as previously stated.

Secondary S of transformer T₂ supplies this unbalance voltage to the input of a full wave bridge-type rectifier 13, the output whereof is connected to a galvanometer 21. This rectifier may be of any type but for the best sensitivity it preferably comprises four enclosed electromagnetic relays 14, 14 and 15, 15 synchronously driven from the alternating current power source through copper oxide rectifiers 16, 17 and condenser 18. Opposite relays 14, 14 operate together on one half-cycle through rectifier 17 while during the next half-cycle relays 15, 15 operate together through rectifier 16. The form of relays herein disclosed is more particularly described in applicant's copending application Serial No. 198,629 filed March 29, 1938. Briefly, however, they comprise a tubular glass envelope having a contact strip of magnetic material sealed in at each end so that the two free ends of the two strips are near each other but not in contact. The envelope is exhausted and filled with inert gas. An operating coil is wound around the glass envelope so as to induce magnetism in the two strips when a current is passed through the coil whereby the two contacts are closed.

Fig. 3 discloses how the magnetic circuit would be made up when it is desired to measure the thickness of loose sheets of foil or other non-magnetic material 4A. In this case, strip 3 which in Fig. 2 was assumed to have permanently embedded therein an inlay 4 is replaced by a plate, rod, reed, sheet or disc 3A whose dimensions are at least large enough to cover the probes 1 and 2 and to extend substantially normal to their axis a distance about equal to their length. At this point it should be noted that these approximate relative dimensions are not the criteria for properly proportioning this bridge. The important criteria are that the probes 1 and 2 and strip 3 or 3A should be of a magnetic material which possesses a reasonably high permeability, that the two probes should be about identical in size and shape for magnetic symmetry and that all three parts should be of such dimensions as to maintain the two return air paths at relatively high reluctances. Also the air-gap reluctance between probe 1 and strip 3 or 3A should be negligible. A disc of relatively large diameter instead of a rod or strip for element 3 or 3A will therefor satisfy these criteria or in the case of Fig. 3 the strip 3A may be an integral part of probe 1. Therefore, the term "strip" in the appended claims should be understood as including such equivalent terms as rod, disc, plate, reed or sheet. For the reasons given above in connection with Figs. 1 and 2 the unbalance voltage measured by galvanometer 21 is a function of the thickness T of sheet 4A.

In Fig. 4 is shown a method of employing the apparatus of Fig. 1 to indirectly measure the thickness of sheets of magnetic material. In this case probes 1 and 2 are first separated and fixed at a predetermined distance by inserting a magnetic sheet of thickness D slightly greater in thickness than the sheet to be measured and clamping the movable probe 2 in place. The bridge is then adjusted for balance and the thick magnetic sheet removed. Sheets 3B are then inserted with one surface contiguous with the end of probe 1 as indicated. As before there will, in effect, be a distance T having a reluctance $T/\mu a_p$ inserted in one magnetic path to unbalance the bridge. The thickness W of sheet 3B is then obtained by subtracting T from D or $$W = D - T \qquad (1)$$

where
W = thickness of magnetic sheet.
D = distance between probes 1 and 2.
T = thickness of air space.

Fig. 5 shows a preferred form of jig which has been found useful for holding one form of magnetic strip in place. The specific form of strip 3 herein disclosed is as shown in Figs. 1 and 2 and has permanently embedded therein the test specimen in the form of an inlay 4, the thickness whereof is to be measured. It is obvious that since the structure of this specimen includes a strip of magnetic material, the latter may be utilized as part of the magnetic bridge. Inserting a new strip 3 for each specimen 4 to be tested, however, requires that the strips be limited to a substantially fixed position. Notch 31' in rod 31 and spring clamp 34' attached to fixed support 34 perform this function. The position of notch 31' is adjusted by thumbscrew 33 threaded in another fixed support 32.

Probe 1 is given a tight fit in non-magnetic holder 22 as shown which, in turn, is securely held in fixed position by setscrew 25 at support 24. A similarly shaped non-magnetic holder 23 holds probe 2 and is adapted for longitudinal sliding movement in bearing support 26. A hand lever 28, fulcrumed at fixed block 29 engages holder 23 through a pin 30 to impart the necessary longitudinal movement. Spring 27 urges holder 23 and consequently probe 2 toward the specimen with sufficient force to insure substantially negligible air-gap reluctances where the probes engage the specimen. A retaining plate 26' is secured to support 26 to retain spring 27 in place.

In order to use the jig for measuring magnetic sheets as in Fig. 4 probe 2 may be fixed in position by tightening thumbscrew 35 shown in Fig. 5, so as to clamp holder 23 stationary with respect to bearing 26.

Exciting coils 5, 5 are wound around the probes and are frictionally secured or cemented to their respective holders. Pick-up coils 6, 6 are similarly mounted. The electrical connections to these coils are as shown in Fig. 1 but have been deleted in this figure for the sake of clarity.

The bridge as above described may be used to measure thickness in either one of two ways. First, it may be used as a direct indicator of the thickness where galvanometer 21 is empirically calibrated to indicate directly the thickness of a test specimen in suitable units of length.

It can be shown mathematically that for the circuit shown in Fig. 1 the response of galvanometer 21 will obey the following law:

$$M = \frac{KT}{T+C} \quad (2)$$

M=response of galvanometer 21.
T=thickness of specimen.
K and C are constants which may be empirically determined.

Constants K and C in the above expression may be easily determined for a given strip 3 or sheet or disc 3A by successively inserting two non-magnetic shims of known thickness between it and probe 2 and computing the constants from the two known thicknesses and the two galvanometer responses. For the case shown in Fig. 4 these constants may be determined by successively inserting in the bridge two different magnetic sheets of known thickness.

The bridge may also be used by the "null" method wherein it is initially balanced with both probes 1 and 2 contiguous with opposite faces of a magnetic strip such as strip 3A. The electric bridge will then balance with resistor R3 equal to resistor R4 since the electromotive forces induced in the two coils 6, 6 are equal. The non-magnetic specimen to be measured is then inserted between probe 2 and strip 3 or 3A as before whereupon the electric bridge may be rebalanced by changing variable resistor R4 by an amount ΔR4. The thickness T of the specimen then obeys the following law:

$$T = \frac{\Delta R_4}{E - F(\Delta R_4)} \quad (3)$$

where
ΔR4=change in resistance R4 to rebalance electric bridge.
E and F are constants which may be empirically determined.

The constants E and F are determined in a manner similar to that previously described for Equation 2.

It should be noted that both of the above-described methods result in determining the degree of unbalance of the magnetic bridge occasioned by the insertion of the non-magnetic specimen. It should also be observed that the term "non-magnetic specimen" includes an air-gap as is indicated in Fig. 4 and that the distance T is always the distance between the magnetic strip 3, 3A or 3B and probe 2 which distance is substantially devoid of magnetic material. Moreover, the non-magnetic specimen may actually be classed as diamagnetic or slightly paramagnetic but in the latter case its permeability must be small compared with that of the probes 1 and 2 and the strip 3. It therefore necessarily follows that a calibration for measuring one kind of material will not hold for another material if its permeability is very much different.

Actual measurements made by this apparatus indicate that it is capable of great sensitivity. For one galvanometer used the sensitivity was about $3(10)^{-6}$ inches per scale division and the tests indicate that this is not the limit of sensitivity.

What is claimed is:

1. A magnetic bridge for measuring small distances comprising in combination two collinearly disposed rods of magnetic material with one end of each adjacent to the other, a strip of magnetic material interposed between said adjacent ends so that its long dimension is substantially normal to the engaging ends of the rods, and contiguous to the engaging ends of the rods, means for displacing one of the rods from the strip by a distance to be measured, said distance being substantially devoid of any magnetic material, means for impressing substantially equal and varying magnetomotive forces in each of the rods to produce varying fluxes therein, and electric means responsive to said fluxes and adapted to indicate the condition of balance of the magnetic bridge both before and after displacement.

2. An apparatus for measuring thickness comprising two collinearly disposed rods of magnetic material, elastic means for urging the adjacent ends of the rods together, means for separating said ends against the action of the elastic means, means for supporting therebetween a strip of magnetic material the long dimension whereof is substantially perpendicular to the principal axis of the rods, means for magnetically exciting each of the rods with varying magnetomotive forces of equal magnitudes, and means for indicating the difference in the total fluxes generated in said two rods by said magnetomotive forces.

3. An apparatus for measuring the thickness of non-magnetic material comprising a magnetic bridge having two magnetic paths, a portion common to each path including a strip of magnetic material, each of the remainder of said paths including some magnetic material of substantially the same shape and reluctance as the other, each path also having in series therewith a larger reluctance substantially equal to that included in the other path, means for impressing substantially equal varying magnetomotive forces in each path, means for inserting in one path a piece of non-magnetic material the thickness whereof is to be measured thereby increasing the reluctance of said path and changing the total magnetic flux induced therein, and means for measuring the magnitude of the change in said magnetic flux.

4. An apparatus for measuring the thickness of a piece of non-magnetic material permanently attached to a strip of magnetic material comprising a symmetrical magnetic bridge with two magnetic paths, a portion common to both paths including said strip of magnetic material, two similar rods of magnetic material symmetrically disposed on opposite surfaces of said magnetic strip and with one end of one rod contiguous to one surface thereof and one end of the other rod separated from the other surface by the thickness of said non-magnetic material, said rods forming part of the two magnetic paths means for impressing substantially equal and varying magnetomotive forces in each of the rods to induce varying fluxes therein, the difference in the magnitude whereof is determined by the thickness of said magnetic material, and means for measuring the difference in flux magnitudes.

5. An apparatus for measuring the thickness of non-magnetic material comprising a magnetic bridge, two similar and symmetric magnetic meshes therefor each mesh including portions of low reluctance and at least one portion of relatively higher reluctance, means for inducing varying and equal magnetomotive forces in each mesh, means for inserting said non-magnetic material in the low reluctance portion of one of said meshes whereby a magnetic unbalance is produced, the magnitude whereof is determined by the thickness of the non-magnetic material, and electric means associated with both of said meshes adapted to measure the degree of magnetic unbalance whereby the thickness of said non-magnetic material is measured.

6. An apparatus for measuring thickness comprising in combination a magnetic bridge, an electric bridge having two branches, two magnetic paths for said magnetic bridge having included as parts thereof two rods and a strip all of magnetic material so arranged that the principal axes of the two rods are collinear and their adjacent ends contiguous and substantially normal to the strip, said strip forming a magnetic path common to both of said two paths, means for impressing substantially equal and varying magnetomotive forces in each of said paths to induce varying fluxes therein, means responsive to said induced fluxes adapted to produce electromotive forces in the two branches of said electric bridge, means for initially balancing said electric bridge for a given magnetic condition in said magnetic bridge, means for inserting a piece of non-magnetic material to be measured between said strip and the adjacent end of one of said rods thereby correspondingly changing the reluctance of its magnetic path, and means associated with said electric bridge adapted to measure said change in reluctance as the measure of the thickness of the non-magnetic material.

WALTER B. ELLWOOD.